M. O. ANTHONY.
RUBBER TYPE.
APPLICATION FILED JUNE 13, 1912.

1,174,954.

Patented Mar. 14, 1916.

WITNESSES
Cornelius Zabriskie
Mary E. Freeman

INVENTOR
Marcus O. Anthony
BY
Griffins Bernhard
ATTORNEYS

THE COLUMBIA PLANOGRAPH CO., WASHINGTON, D. C.

UNITED STATES PATENT OFFICE.

MARCUS O. ANTHONY, OF NEW YORK, N. Y., ASSIGNOR TO THE TAGOGRAPH CO., OF NEW YORK, N. Y., A CORPORATION OF NEW YORK.

RUBBER TYPE.

1,174,954. Specification of Letters Patent. Patented Mar. 14, 1916.

Application filed June 13, 1912. Serial No. 703,372.

*To all whom it may concern:*

Be it known that I, MARCUS O. ANTHONY, a citizen of the United States, residing in the city of New York, borough of Manhattan, county and State of New York, have invented a certain new and useful Rubber Type, of which the following is a specification.

This invention is an improvement in rubber type.

Numerous forms of rubber type have heretofore been used, but, so far as I am aware, they all have certain disadvantages of which it is the aim of the present invention to overcome. For example, the commonly used rubber type band with integral printing characters becomes permanently stretched after it has been used a short time, with the result that it is impossible to accurately print therefrom. In order to obviate the objection due to permanent stretching, it has been proposed to mount the rubber type on a rigid backing, such as a metal plate or a fabric. These structures, however, also possess certain inherent disadvantages.

The present invention embodies rubber type, preferably in the form of a band, vulcanized or similarly secured to a fabric and intermediate which type and fabric is a perforated thin metallic band. This results in a structure which is inelastic yet flexible and particularly durable.

In the accompanying drawings, I have illustrated one practical embodiment of the invention, but the construction shown therein, is to be understood as illustrative, only, and not as defining the limits of the invention.

Figure 1:
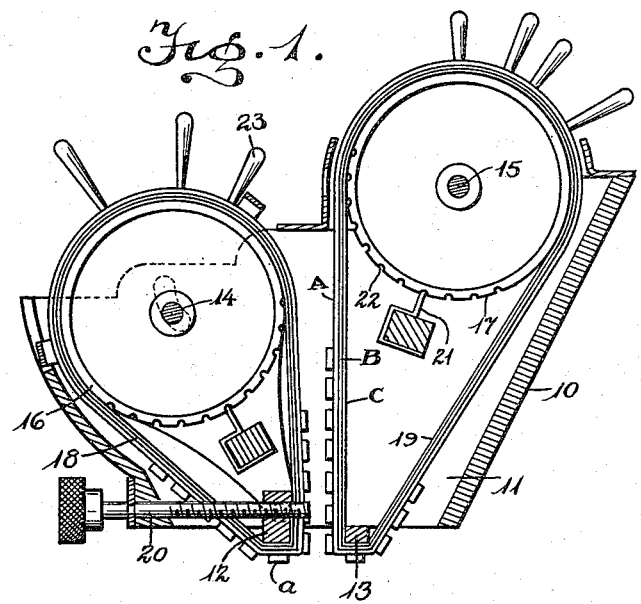
Figure 2:
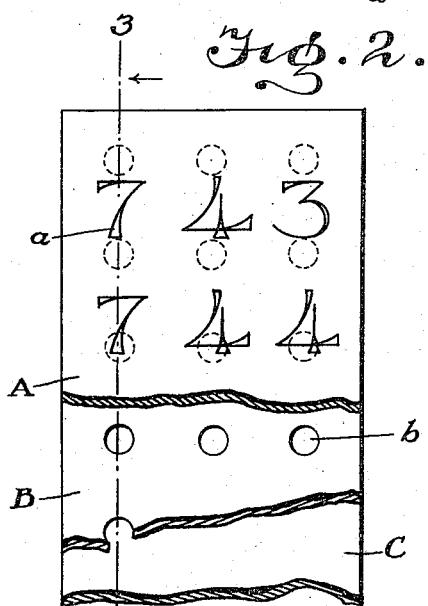
Figure 3:
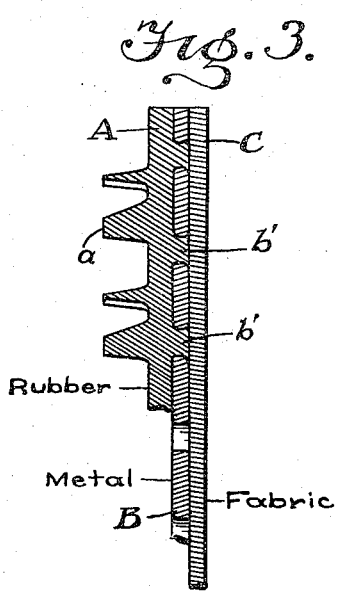

Figure 1 is a vertical section, partly in elevation, illustrating the present invention in connection with a particular form of printing device. Fig. 2 is a plan view on an enlarged scale of a part of the rubber type, illustrating the layers of rubber, metal and fabric partly broken away and in section. Fig. 3 is a sectional view on the line 3—3 of Fig. 2.

Rubber type embodying the present invention is illustrated more particularly in Figs. 2 and 3 of the drawings, wherein A indicates a layer of rubber, B a layer of perforated flexible metal, and C a backing composed of fabric, rubber, or other appropriate material. The layer B of flexible metal is interposed between the layers A, C of rubber and fabric, respectively, and this intermediate flexible layer B is provided with a number of perforations *b* through which is adapted to extend some of the rubber composing layer A, thereby forming the tongues *b′* which unite rubber layer A to backing C, the result being to substantially incase the flexible metal layer B by the rubber and fabric layers A, C, respectively.

Layer A is composed of any suitable kind of rubber or rubber compound, and this layer is provided with type characters *a* integral therewith, said type characters being molded or otherwise formed on the surface of the rubber layer. Obviously, the type characters may be of any form, but as shown in Fig. 2, the type characters are numerals arranged in rows.

The backing C is composed, preferably, of textile fabric, but any other flexible material may be used as a backing layer; for example the backing may be composed of rubber, but experience shows that fabric is probably the most suitable material for the purposes of the invention.

The several layers formed and arranged as described constitute what may be referred to as a composite fabric, wherein the front layer and the backing layer are intimately united with the interposed flexible metal layer. The composite fabric is preferably used in the form of a substantially endless band, as shown in Fig. 1, said composite fabric being formed into a loop, and the end portions of said fabric united in any suitable or desirable way, so as to result in the endless band.

Obviously, the fabric may be of any desired width and length, and if desired the fabric may be quite narrow so as to contain a single row of figures, or it may be wide enough to contain two or more rows of figures, or it may be wide enough to carry the names of the months in the year or the days of the week. Manifestly, any desired data may be provided on the endless band to serve the purposes for which the band is intended. As disclosed in Fig. 1, two endless bands are employed in a printing device of the character disclosed in a prior application filed on December 30th, 1911, by Marcus O. Anthony and Bernhard H. Flurscheim, Serial No. 668,609. As therein shown and described, the printing device embodies a head 10 provided with a chamber 11, at the lower part of which are positioned the guide members 12, 13. Said head is provided with bearings for shafts 14, 15, which carry rollers or wheels 16, 17, respectively. Around the roller 16 fits an endless band 18 which passes below the guide 12. Coöperating with the other roller 17 is an endless band 19 passing below the guide 13. As shown, guide 12 is adjusted relative to guide 13 by the operation of a spindle 20. Rollers 16, 17 are retained in adjusted positions by spring pawls 21, fitting in notches 22. The rollers 16, 17 accommodate a series of bands, each of said rollers being provided with a finger-piece 23, whereby the bands may be shifted as desired by imparting rotary motion to the rollers.

The printing bands 18, 19 are composed of rubber, the flexible metal and the backing, all as hereinbefore described, each printing band being preferably of the endless form, and having the type characters $a$.

While I have shown and described the new rubber type as adapted for use in connection with the printing device of the prior application, it is to be understood that the printing band may be used in connection with ordinary hand stamps employed for dating and numbering purposes, and, furthermore, that the composite fabric may be used for any other purpose than those herein mentioned.

When the invention is embodied in an endless band for printing purposes, the flexible metal layer B operates to wholly preclude any permanent stretching or elongation of the rubber type, for the reason that the metal layer is inelastic, although said layer is flexible in order that the fabric may yield or give when passing around the supporting wheels and guides. The backing employed at the rear of the composite fabric enables the rubber to unite firmly to the textile fabric, and thus the rubber layer and the perforated metal layer are so intimately secured together that the parts will not separate. When rubber and perforated metal are used to the exclusion of the fabric, or other backing material, it is found that the rubber will pull away from the metal, and thus the endless band will not act efficiently, but by placing the perforated metal between layers of rubber and fabric, the rubber will be forced through the perforations in the flexible metal and unite with the material of the backing. As a result of the new construction the rubber material passing through the perforations of the metal act to "key" the metal and rubber together, and the union of the rubber with the fabric is secured to the best advantage.

Having thus fully described the invention, what I claim as new, and desire to secure by Letters Patent is:

1. A new article of manufacture comprising a flexible non-stretching length or band of rubber type unitary with a flexible fibrous backing and a flexible metal, said flexible metal being positioned intermediate said type and the backing and operating to preclude permanent stretching of the rubber type.

2. A new article of manufacture comprising a nonstretching and flexible length or band of rubber type unitary with a flexible fibrous backing and a flexible perforated metal, said rubber type being keyed to said perforated metal.

3. A new article of manufacture embodying a flexible non-stretching length or band comprising a flexible rubber layer provided with printing characters, a flexible backing composed of fabric and a perforated layer of flexible metal positioned intermediate said rubber layer and the backing.

4. As a new article of manufacture an endless flexible non-stretching printing band embodying a layer of rubber type, a flexible metal layer adjoining said type layer, and a backing of fabric adjoining the metal band, the said layers and backing being unitary.

5. A new article of manufacture comprising a band of rubber type, a perforated metal band, and a fabric adjoining said metal band and secured to the band of type through the perforations in the metal band.

6. As a new article of manufacture, a composite flexible printing band comprising an endless member composed of rubber and formed with printing characters on its exposed face, an endless backing composed of fabric, and a third member composed of an endless piece of perforated metal positioned intermediate the rubber member and the fabric backing member and unitary therewith so as to attain the necessary adhesion between the rubber and the fabric, said interposed metal member operating to preclude stretching of the rubber with respect to the fabric backing.

7. A new article of manufacture comprising a perforated flexible metal band, a band of fabric on one side thereof and a band of rubber type on the opposite side and secured to the fabric through the perforations in the metal band.

In testimony whereof I have signed my name to this specification in the presence of two subscribing witnesses.

MARCUS O. ANTHONY.

Witnessess:
  M. C. RODRIGUEZ,
  H. I. BERNHARD.

Copies of this patent may be obtained for five cents each, by addressing the "Commissioner of Patents, Washington, D. C."